(12) United States Patent
Yoshikawa et al.

(10) Patent No.: US 7,708,306 B2
(45) Date of Patent: May 4, 2010

(54) OCCUPANT RESTRAINING DEVICE

(75) Inventors: Hiromichi Yoshikawa, Tokyo (JP); Kimihiro Koshikawa, Tokyo (JP)

(73) Assignee: Takata Corporation, Tokyo (JP)

( * ) Notice: Subject to any disclaimer, the term of this patent is extended or adjusted under 35 U.S.C. 154(b) by 27 days.

(21) Appl. No.: 12/091,251

(22) PCT Filed: Oct. 23, 2006

(86) PCT No.: PCT/JP2006/321027

§ 371 (c)(1), (2), (4) Date: Apr. 23, 2008

(87) PCT Pub. No.: WO2007/049539

PCT Pub. Date: May 3, 2007

(65) Prior Publication Data

US 2009/0121457 A1 May 14, 2009

(30) Foreign Application Priority Data

Oct. 28, 2005 (JP) .............................. 2005-314858

(51) Int. Cl.
*B60R 21/16* (2006.01)
(52) U.S. Cl. ................................. 280/730.1; 280/743.1
(58) Field of Classification Search .............. 280/730.1, 280/743.1
See application file for complete search history.

(56) References Cited

U.S. PATENT DOCUMENTS

| | | | | |
|---|---|---|---|---|
| 4,623,192 A | * | 11/1986 | Koide et al. | ............ 297/284.11 |
| 5,316,337 A | * | 5/1994 | Yamaji et al. | ............ 280/743.1 |
| 5,584,508 A | * | 12/1996 | Maruyama et al. | ........ 280/743.1 |
| 5,664,805 A | * | 9/1997 | Yoshida et al. | ........... 280/743.1 |
| 6,145,879 A | * | 11/2000 | Lowe et al. | .............. 280/743.1 |
| 6,752,454 B2 | * | 6/2004 | Ruel et al. | ................ 297/216.1 |
| 6,905,134 B2 | * | 6/2005 | Saiguchi et al. | .......... 280/730.1 |
| 7,032,926 B2 | * | 4/2006 | Ruel | ....................... 280/743.1 |
| 7,527,333 B2 | * | 5/2009 | Suzuki et al. | ............ 297/216.1 |
| 7,549,674 B2 | | 6/2009 | Yoshikawa et al. | |
| 2005/0046156 A1 | | 3/2005 | Yoshikawa et al. | |
| 2007/0132213 A1 | * | 6/2007 | Suzuki et al. | ............ 280/730.1 |

(Continued)

FOREIGN PATENT DOCUMENTS

JP 52 5126 1/1977

(Continued)

OTHER PUBLICATIONS

An International Search Report dated Dec. 25, 2006, from the International Bureau in corresponding International (PCT) application No. PCT/JP2006/321027.

*Primary Examiner*—Faye M. Fleming
(74) *Attorney, Agent, or Firm*—Fitch, Even, Tabin & Flannery

(57) ABSTRACT

An occupant restraining device is disclosed, in which stress applied to a stitch section of a sewn bag can be dispersed at the time of inflation of the bag. In one form, the device includes an inflatable bag disposed above a seat pan with the bag being capable of pushing a front portion of a seat cushion from below, and an inflator (gas generator) for inflating the bag. Weave directions of panels are biased with respect to longitudinal stitch lines by about 45°. Accordingly, stress applied to a stitch section by the lines can be dispersed at the time of inflation of the bag.

19 Claims, 8 Drawing Sheets

U.S. PATENT DOCUMENTS

2007/0132214 A1\* 6/2007 Suzuki et al. ............ 280/730.1
2007/0246919 A1\* 10/2007 Kai ........................ 280/730.1

FOREIGN PATENT DOCUMENTS

| | | |
|---|---|---|
| JP | 10 02949 | 2/1998 |
| JP | H10-29490 A | 2/1998 |
| JP | 10 217818 | 8/1998 |
| JP | 2002 220017 | 8/2002 |
| JP | 2005 02910 | 2/2005 |
| JP | 2005-29102 A | 2/2005 |
| JP | 2005 67465 | 3/2005 |
| JP | 2005-067465 A | 3/2005 |
| JP | 2005-255148 A | 9/2005 |

\* cited by examiner

Fig. 4
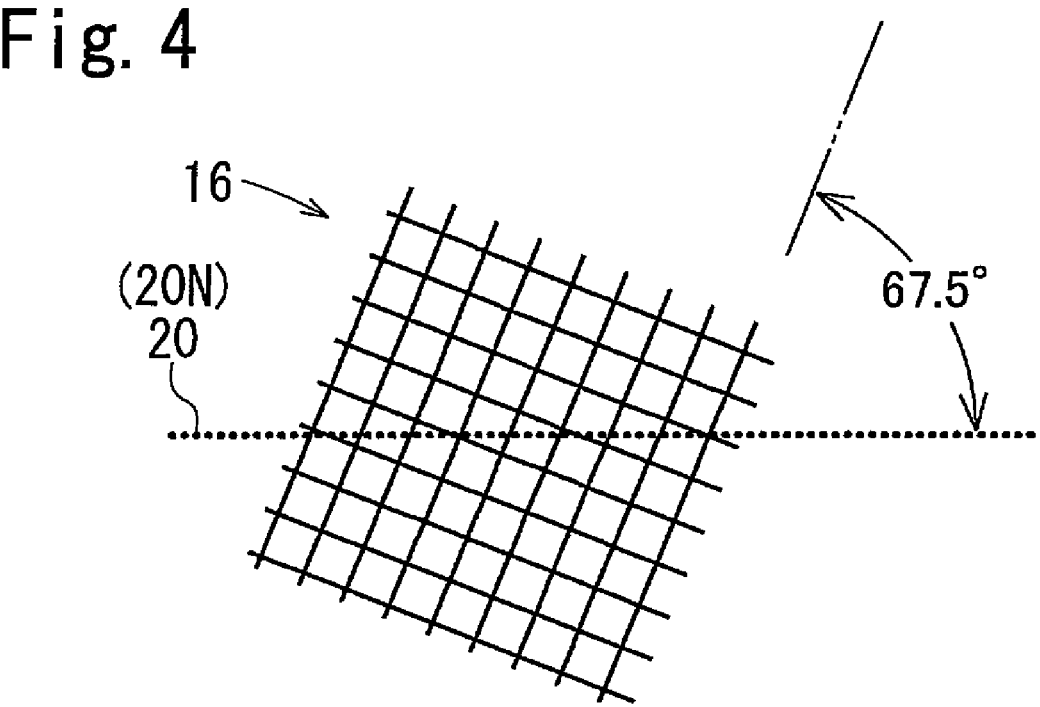
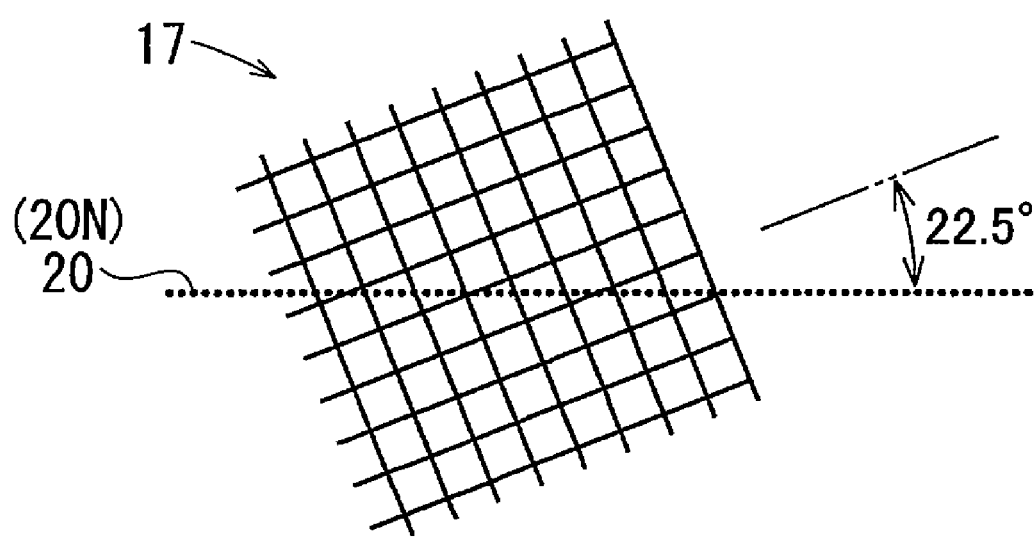

OCCUPANT RESTRAINING DEVICE

CROSS-REFERENCE TO RELATED APPLICATIONS

This application is a U.S. national phase application filed under 35 U.S.C. § 371 of International Application PCT/JP2006/321027, filed on Oct 23, 2006, designating the United States, which claims priority from Japanese Application 2005-314858, filed Oct. 28, 2005, which are hereby incorporated herein by reference in their entirety.

FIELD OF THE INVENTION

The present invention relates to an occupant restraining device for restraining an occupant in a seat of a vehicle, such as an automobile, during a collision, and particularly, to an occupant restraining device that restrains an occupant's waist during a frontal collision in order to prevent the occupant's body from moving forward and downward.

BACKGROUND OF THE INVENTION

As a system for restraining a vehicle occupant during a collision, an occupant restraining device that prevents a so-called submarine phenomenon is known. Specifically, a submarine phenomenon occurs when an occupant wearing a seatbelt slips through a space below a lap belt during a frontal collision. Japanese Unexamined Patent Application Publication No. 10-217818 discloses an occupant restraining device having an inflatable bag disposed between a seat cushion and a seat pan. When a vehicle is involved in a collision, the bag inflates and pushes the front portion of the seat cushion upward.

FIG. 7 is a longitudinal sectional view of the occupant restraining device of Japanese Unexamined Patent Application Publication No. 10-217818 as viewed in a front-back direction of a seat. At the front portion of the seat, an airbag 44 is disposed between a cushion frame (seat pan) 40 and a seat pad 42. The airbag 44 extends in a left-right width direction of the seat and can be inflated by an inflator 46. The upper surface of the seat pad 42 is covered with a trim cover 48 on which an occupant can be seated.

When the inflator 46 is actuated in response to a collision of the vehicle, the airbag 44 is inflated, causing the front portion of the seat pad 42 to be pushed upward or to be thrust upward from below. This increases the density, thereby preventing (including suppressing) forward movement of the occupant's body.

Generally, an airbag is formed of two sheets of panels made of fabric that are stacked and sewn together.

SUMMARY OF THE INVENTION

An object of the present invention is to provide an occupant restraining device in which stress applied to a stitch section of a sewn bag can be dispersed at the time of inflation of the bag.

An occupant restraining device according to the present invention includes a bag disposed below a seat cushion and extending in a left-right width direction of a seat, the bag being inflatable and capable of pushing the seat cushion from below; and a gas generator that inflates the bag when a vehicle is in an emergency situation. The bag includes panels formed of woven fabric that are stacked and sewn together, the bag having a stitch line extending along a longitudinal edge of the bag. A weave direction of each panel is biased with respect to a longitudinal direction of the bag.

The stitch line may include a longitudinal stitch line extending along the longitudinal edge and a lateral stitch line extending in a lateral direction of the bag. The longitudinal stitch line may be linear.

The lateral stitch line may be curved so as to bulge towards outside of the bag.

BRIEF DESCRIPTION OF THE DRAWINGS

FIG. 4 illustrates weave directions of panels constituting the bag.

DETAILED DESCRIPTION OF THE PREFERRED EMBODIMENTS

In the present invention, a weave direction of each of panels constituting a bag and a longitudinal direction of the bag are biased with respect to each other. A longitudinal stitch line extends along a longitudinal edge of the bag, which implies that the longitudinal stitch line is biased with respect to the weave direction of each panel in the present invention. Accordingly, stress applied to a stitch section at the time of inflation of the bag is reduced as compared to a case where the weave direction is parallel to the longitudinal stitch line.

In a case where the longitudinal stitch line of the bag is linear, the entire longitudinal stitch line is biased with respect to the weave direction of each panel.

In the present invention, a lateral stitch line is made into an outwardly bulging curve line. This allows most of the lateral stitch line to be biased with respect to the weave direction of each panel, whereby stress applied to the stitch section of the lateral stitch line can be reduced at the time of inflation of the bag.

Figure 1:
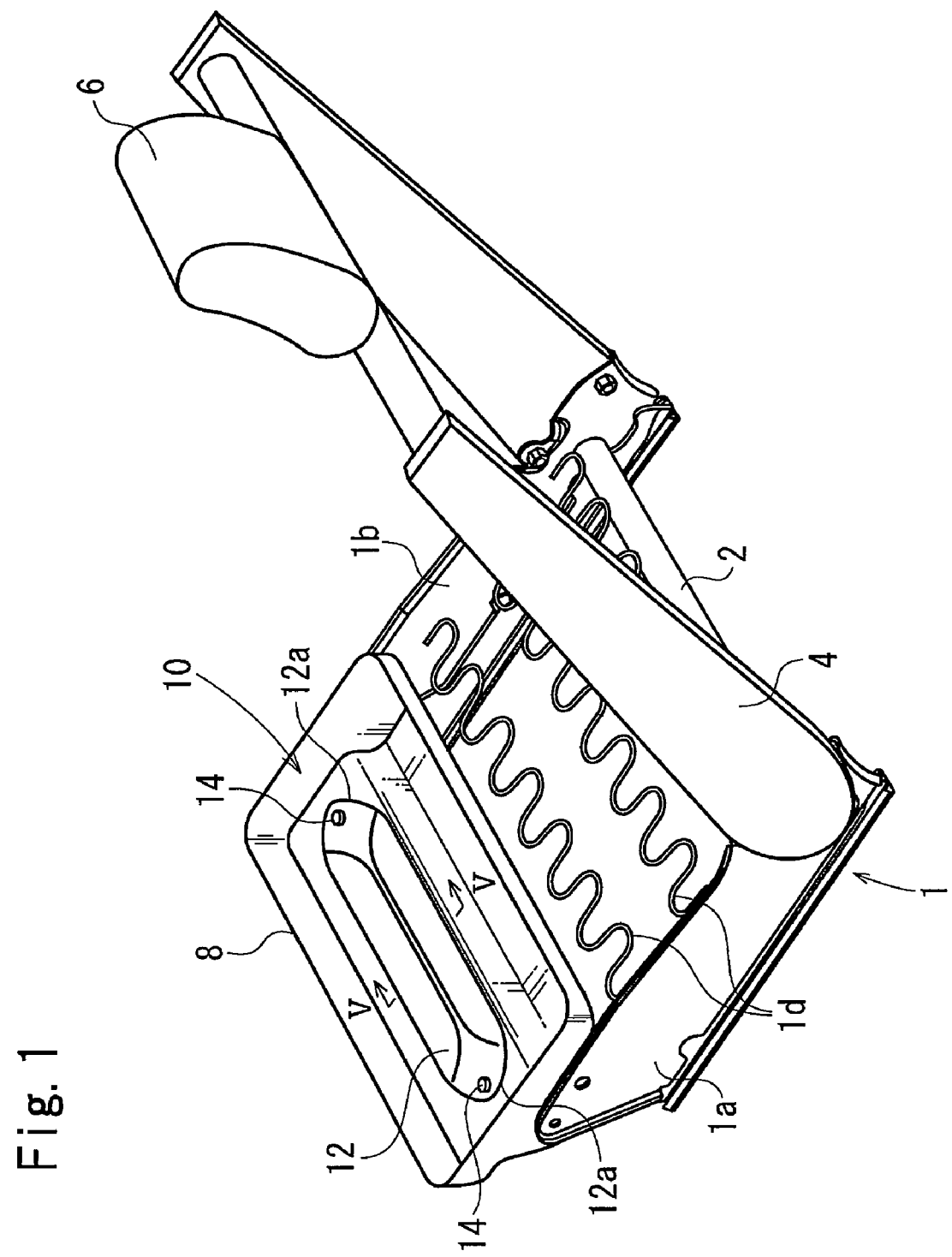
FIG. 1 is a perspective view showing a non-inflated state of a bag in an occupant restraining device according to an embodiment, which is installed in a frame of a seat.
Figure 2:
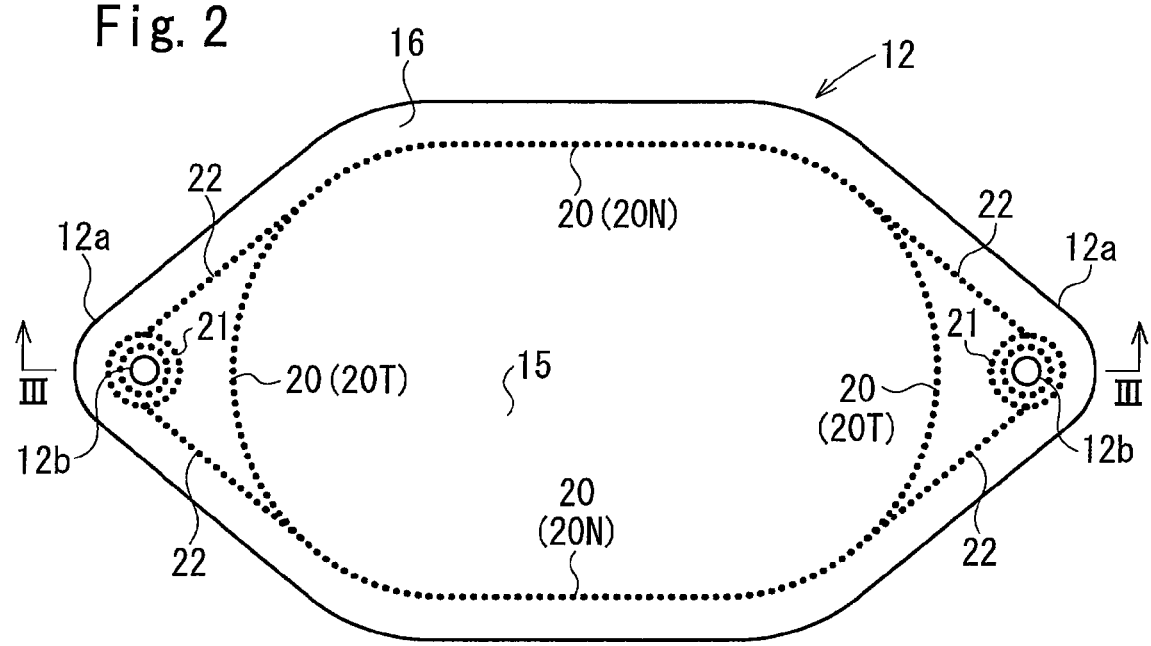
FIG. 2 is a plan view of the bag.
Figure 3:
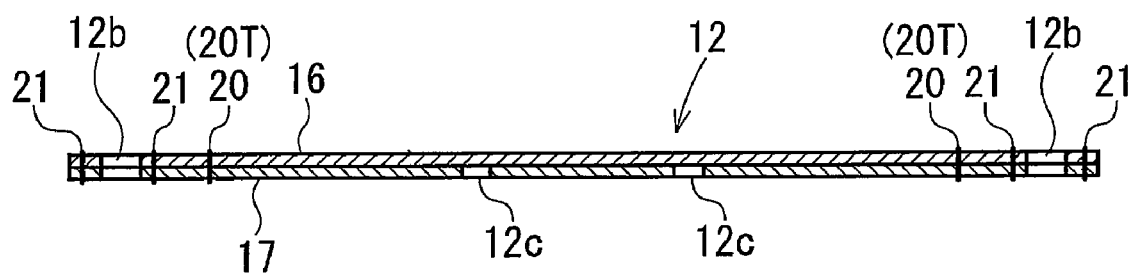
FIG. 3 is a cross-sectional view taken along line III-III in FIG. 2.
Figure 5:
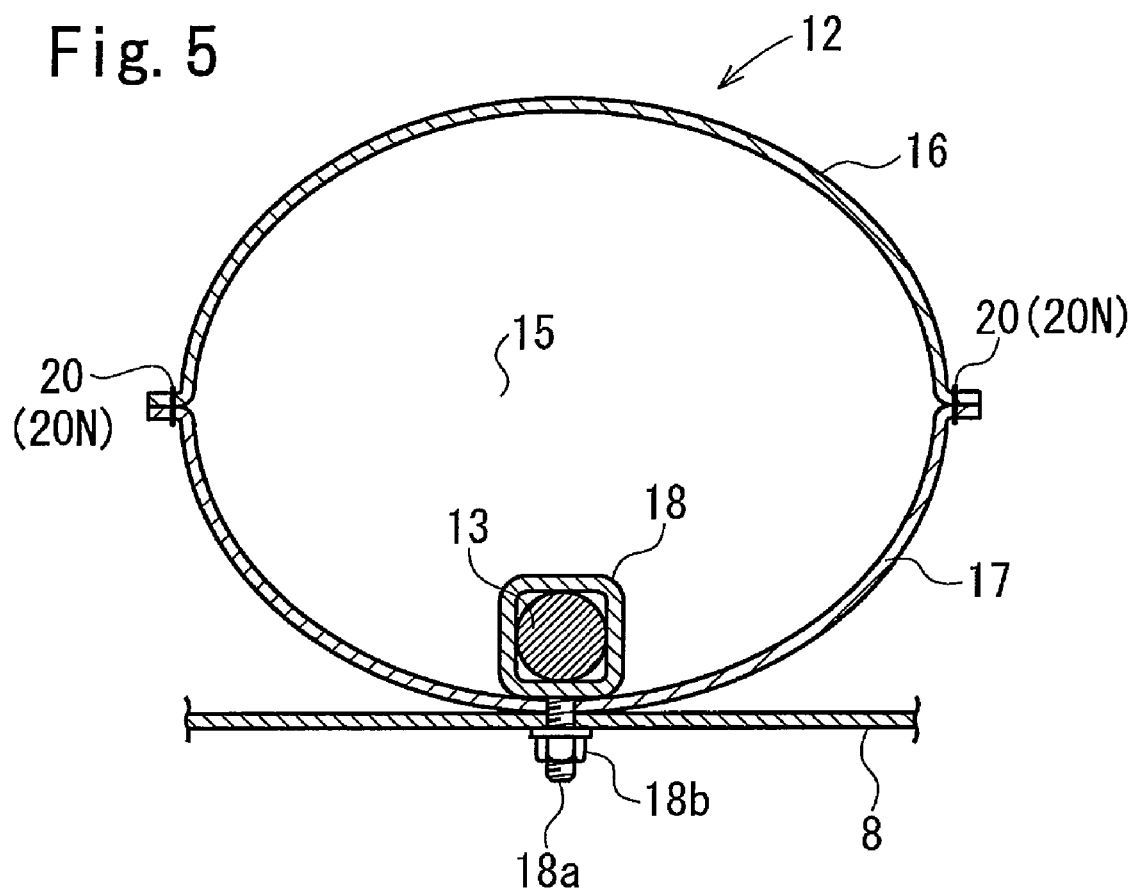
FIG. 5 is a cross-sectional view taken along line V-V in FIG. 1 and shows the bag in an inflated state.
Figure 6:
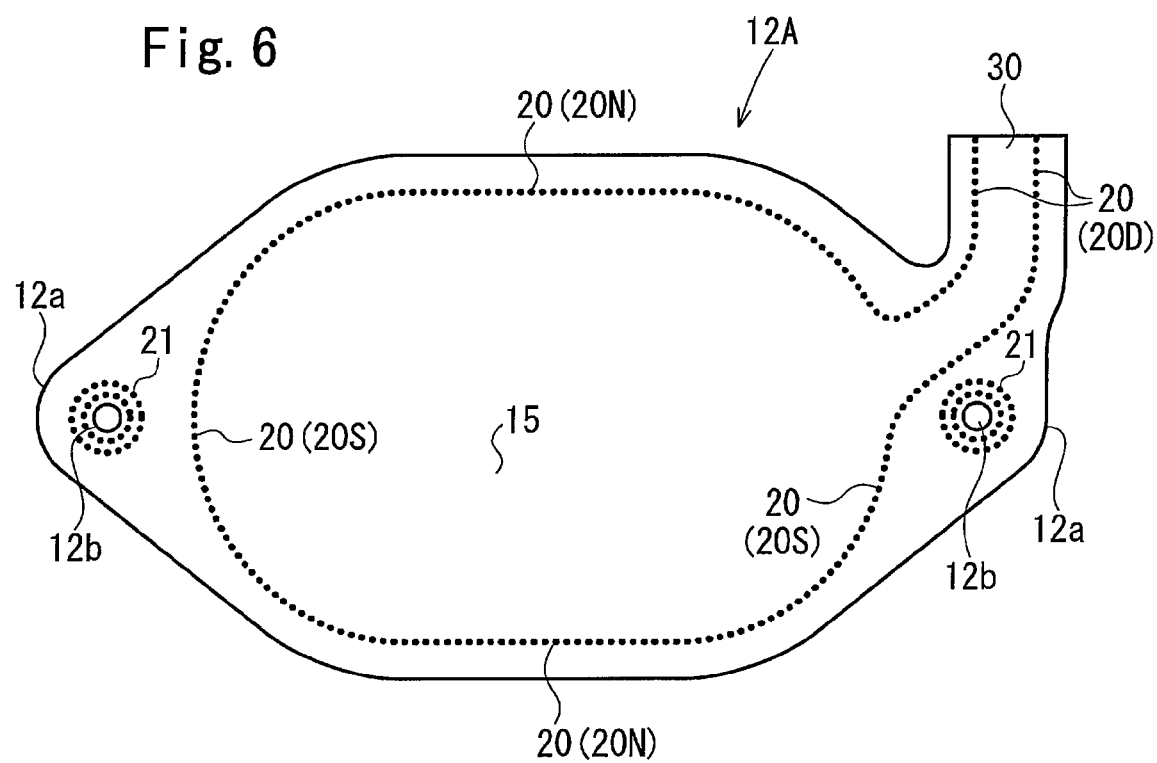
FIG. 6 is a plan view of a bag used in another embodiment.
Figure 7:
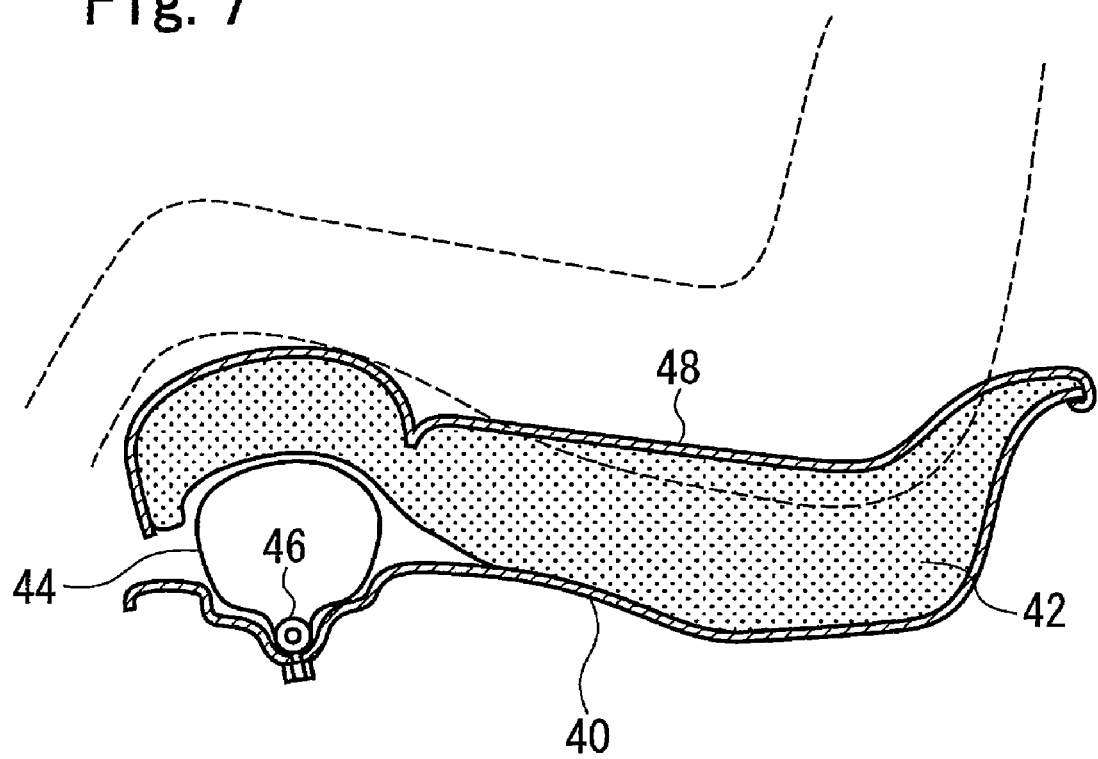
FIG. 7 is a longitudinal sectional view of an occupant restraining device of related art as viewed in a front-back direction of a seat.

Embodiments of the present invention will be described below with reference to the drawings. FIG. 1 is a perspective view showing a non-inflated state of a bag in an occupant restraining device according to an embodiment of the present invention, which is installed in a frame of a seat. FIG. 2 is a plan view of the bag in FIG. 1. FIG. 3 is a cross-sectional view taken along line III-III in FIG. 2. FIG. 4 illustrates weave directions of panels constituting the bag. FIG. 5 is a cross-sectional view taken along line V-V in FIG. 1 and shows the bag in an inflated state. FIG. 6 is a plan view of a bag used in another embodiment.

A frame constituting a seat of a vehicle includes a base frame 1 and a back frame 4 rotatably connected with the base frame 1 by means of a support shaft 2 and a reclining device (not shown). An upper portion of the back frame 4 has a headrest 6 attached thereto. The base frame 1 has left and right side frames 1a and 1b. Front portions of these side frames 1a and 1b have a seat pan 8 bridged therebetween.

Although not shown in the drawings, the base frame 1 and the back frame 4 respectively have mounted thereon a seat cushion and a seat back made of, for example, urethane. The seat pan 8 is disposed below a front portion of the seat cushion. In FIG. 1, reference numeral 1d denotes springs that support the seat cushion.

An occupant restraining device 10 includes an inflatable bag 12 disposed above the seat pan 8 and capable of pushing the front portion of the seat cushion from below, and an inflator (gas generator) 13 for inflating the bag 12. The bag 12 extends in the left-right direction (vehicle-width direction) of the seat pan 8. Both ends of the bag 12 in the left-right direction are respectively provided with stationary sections 12a and 12a fixed to the seat pan 8. Each stationary section 12a is fixed to the seat pan 8 with a bolt 14. The stationary sections 12a and 12a of the bag 12 have therebetween a gas chamber 15 that is inflated as a result of gas entering from the inflator 13.

In this embodiment, the bag 12 is made into the form of a pouch by stacking an upper panel 16 and a lower panel 17 one on top of the other, which are to respectively define an upper half and a lower half of an outer periphery surface of the bag 12 in an inflated state, and then sewing these panels together along the edges thereof. The upper panel 16 and the lower panel 17 are formed of woven fabric of, for example, nylon. Reference numerals 20 to 22 denote stitch lines (seams) defined by, for example, threads used for sewing the panels 16 and 17 together.

As shown in FIG. 2, in this embodiment, the bag 12 is oblong in the left-right width direction of the seat, i.e. the left-right direction in FIG. 2. Each of the panels 16 and 17 has a substantially hexagonal, horizontally-oblong shape in plan view such that a pair of longitudinal edges thereof extends in the left-right direction. Each panel 16, 17 has substantially triangular protruding sections at both the left and right ends thereof. These substantially triangular protruding sections define the stationary sections 12a to be fixed to the seat pan 8. Near the tip of each protruding section is provided a through-hole 12b for the corresponding bolt 14. A central area of the lower panel 17 is provided with stud-bolt through-holes 12c through which stud bolts 18a of a retainer 18 to be described below extend.

The panels 16 and 17 are sewn together along a stitch line 20 that extends entirely along the periphery of an area between the stationary sections 12a and 12a, whereby the gas chamber 15 is formed between the stationary sections 12a and 12a. As shown in FIG. 2, the stitch line 20 has a substantially oval shape that is horizontally oblong.

In detail, the stitch line 20 has a pair of longitudinal stitch lines 20N extending in the left-right direction respectively along the pair of longitudinal edges of each panel 16, 17, and a pair of lateral stitch lines 20T extending in the lateral direction of the bag 12 so as to connect first ends together and second ends together of the longitudinal stitch lines 20N. Specifically, the pair of lateral stitch lines 20T bulges towards outside of the bag 12, or in other words, extends in the form of a substantially circular arc so as to be convex towards the respective left and right ends of each panel 16, 17.

The peripheries of the aligned bolt through-holes 12b of the panels 16 and 17 are sewn together along corresponding stitch lines 21. On the other hand, the peripheries of the left-side stationary sections 12a and 12a of the respective panels 16 and 17 are sewn together along a stitch line 22, and likewise, the peripheries of the right-side stationary sections 12a and 12a of the respective panels 16 and 17 are sewn together along another stitch line 22. As shown in FIG. 2, each of the stitch lines 22 has its opposite ends merged with the stitch line 20 and has its intermediate segment merged with the corresponding stitch line 21.

In this embodiment, the longitudinal edges of the bag 12 are linear, and segments of the longitudinal stitch lines 20N that extend along these longitudinal edges are also linear. These linear segments of the longitudinal stitch lines 20N each have a length that is 30% to 60% or preferably 35% to 50% of the longitudinal length of the bag 12.

In this embodiment, as shown in FIG. 4, the weave directions of the panels 16 and 17 are biased with respect to the longitudinal stitch lines 20N by about 30° to 60°, specifically, by about 35° to 55°, and preferably, by about 45°.

Regarding the lateral stitch lines 20T, the intermediate segments thereof are also biased with respect to the weave directions of the panels 16 and 17.

In this embodiment, the inflator 13 having the shape of a rod is disposed within the bag 12. The inflator 13 extends longitudinally in the vehicle-width direction. The inflator 13 has gas discharge nozzles (not shown) on a periphery surface thereof, and radially discharges gas through these gas discharge nozzles.

As shown in FIG. 5, the inflator 13 has the retainer 18 connected thereto for fixing the inflator 13 to the seat pan 8. The retainer 18 has the stud bolts 18a projecting therefrom. Each stud bolt 18a extends through the corresponding stud-bolt through-hole 12c of the bag 12 and through a corresponding stud-bolt through hole (not given a reference numeral) in the seat pan 8. Moreover, the stud bolt 18a has a nut 18b fastened thereto so as to be fixed to the seat pan 8, whereby the bag 12 is fixed to the seat pan 8.

The bag 12 is folded so as to be laid flat on the upper surface of the seat pan 8 and to have a small width in the front-back direction. Specifically, the bag 12 may be folded after being attached to the seat pan 8, or may be preliminarily folded. In the latter case, the preliminarily folded bag 12 may be attached to the seat pan 8 while retaining the shape thereof with a shape-retaining member (not shown). Alternatively, the bag 12 may be disposed flatly on the seat pan 8 without being folded.

The occupant restraining device 10 operates in the following manner.

When a frontal collision of a vehicle is detected, the inflator 13 discharges gas, whereby the bag 12 is inflated with the gas from the inflator 13. As a result, the front portion of the seat cushion is pushed upward or thrust upward from below. This increases the density, thereby inhibiting or suppressing forward movement of an occupant's waist.

In this embodiment, because the weave directions of the panels 16 and 17 are biased with respect to the longitudinal stitch lines 20N, stress applied to the stitch section by the lines 20N can be dispersed at the time of inflation of the bag 12. In addition, the intermediate segments of the lateral stitch lines 20T are also biased with respect to the weave directions of the panels 16 and 17 so that stress on these segments can be dispersed. Since the stress on the stitch section can be dispersed at the time of inflation, gas leakage through the stitch section can be suppressed or prevented, whereby the internal pressure of the bag 12 can be maintained at a high level over an extended period of time.

Since the pair of longitudinal stitch lines 20N and 20N of the bag 12 are parallel to each other, the bag 12 inflates substantially into the shape of a bale.

Although the inflator 13 is disposed within the bag 12 in the above embodiment, the inflator may alternatively be disposed externally of the bag. FIG. 6 is a plan view showing an example of a bag in a case where an inflator is disposed externally of the bag.

A bag 12A in FIG. 6 has a hose-like duct 30 that extends from one longitudinal (left-right direction) end thereof (i.e.

that extends from near one of the stationary sections 12a). A base end of the duct 30 communicates with the gas chamber 15. A gas-supplying member (such as a pipe) extending from the inflator is inserted through the duct 30, and is connected to the duct 30 with a band (not shown). Thus, the inflator disposed externally of the bag 12A supplies gas into the gas chamber 15 through the gas-supplying member and the duct 30.

The remaining elements of the bag 12A are substantially the same as those of the bag 12 shown in FIGS. 1 to 5. The reference numerals in FIG. 6 that are the same as those in FIGS. 1 to 5 indicate the same elements.

The bag 12A exhibits similar effects to those of the bag 12. In the bag 12A, stitch lines 20D extending along the duct 30 are biased with respect to the weave directions of the panels 16 and 17. Therefore, stress applied to a stitch section by the stitch lines 20D can be dispersed at the time of inflation of the bag, thereby preventing or suppressing gas leakages.

The above embodiments are only examples of the present invention, and the present invention is thus not limited to the above embodiments.

For example, although each of the lateral stitch lines 20T in the above embodiments has a semicircular shape with a uniform R (radius of curvature) in its entirety, a part of the lateral stitch line 20T may be given an R that is different from that of the remaining part thereof.

In the present invention, multiple sheets of panels may be disposed on both upper and lower sides of the gas chamber 15. For example, the bag may be constituted by a total of four panels.

Figure 8:
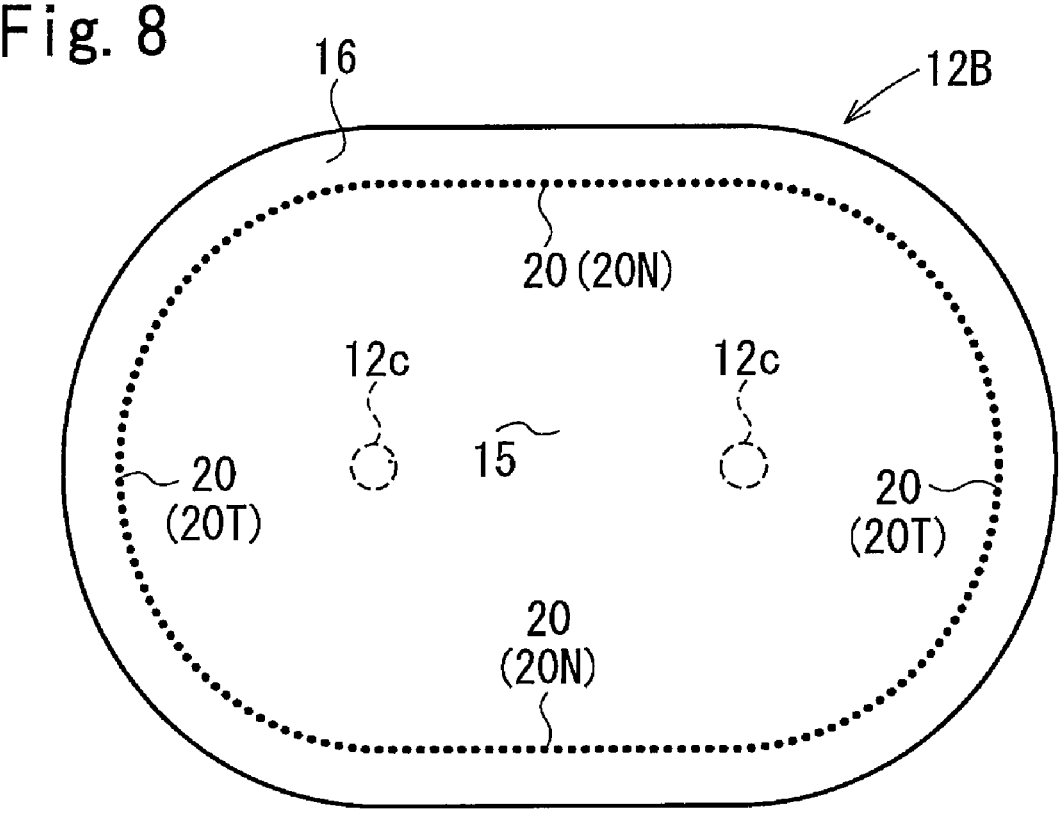
FIG. 8 is a plan view of a bag according to an embodiment.

In the above embodiment shown in FIGS. 1 to 5, the longitudinal ends of the bag 12 are fixed to the seat pan 8 with the bolts 14, and an intermediate portion of the bag 12 in the longitudinal direction thereof is fixed to the seat pan 8 by means of the retainer 18 (the stud bolts 18a) disposed within the bag 12. In the present invention, in such a case where a longitudinally intermediate portion of a bag is fixed to a seat pan by means of a fixing member, such as a retainer, the fixation of the longitudinal ends of the bag to the seat pan may be omitted. FIG. 8 is a plan view of a bag 12B having such a configuration.

The bag 12B in FIG. 8 has a configuration such that the stationary sections 12a and 12a at the longitudinal ends of the bag 12 in the embodiment shown in FIGS. 1 to 5 are removed. The inflatable gas chamber 15 within the bag 12B extends over substantially the entire length from one longitudinal end to the other end.

The remaining elements of the bag 12B are the same as those of the bag 12 in the embodiment shown in FIGS. 1 to 5. The reference numerals in FIG. 8 that are the same as those in FIGS. 1 to 5 indicate the same elements.

The longitudinally intermediate portion of the bag 12B is fixed to the seat pan 8 by means of the stud-bolt through-holes 12c and the retainer 18 (the stud bolts 18a) disposed within the bag 12B. On the other hand, the longitudinal ends of the bag 12B are not fixed to the seat pan 8.

However, the attachment structure of the bag to the seat pan is not limited to that in each of the above embodiments. The bag may be attached to the seat pan by means of other attachment structures.

While the present invention has been described in detail with reference to specific embodiments, it is obvious to those skilled in the art that various modifications are permissible without departing from the scope and spirit of the invention.

The invention claimed is:

1. An occupant restraining device comprising:
   a bag disposed below a seat cushion and extending in a left-right width direction of a seat, the bag being inflatable and capable of pushing the seat cushion from below; and
   a gas generator that inflates the bag with gas when a vehicle is in an emergency situation,
   wherein the bag includes panels formed of woven fabric that are stacked and sewn together, the bag having a longitudinal edge and a stitch line extending in a longitudinal direction along the longitudinal edge, and
   wherein weave directions of each woven fabric panel are orthogonal to each other and are both biased with respect to the longitudinal direction so that the longitudinal direction along which the stitch line extends is oblique to the orthogonal weave directions for minimizing stress on the stitch line and gas leakage therethrough.

2. The occupant restraining device according to claim 1, wherein the stitch line comprises a longitudinal stitch line extending along the longitudinal edge and a lateral stitch line extending in a lateral direction of the bag, the longitudinal stitch line being linear.

3. The occupant restraining device according to claim 2, wherein the lateral stitch line is curved so as to bulge towards outside of the bag.

4. The occupant restraining device according to claim 2, wherein the longitudinal edge of the bag comprises a pair of longitudinal edges, and the longitudinal stitch line comprises longitudinal stitch lines extending along the corresponding longitudinal edges.

5. The occupant restraining device according to claim 4, wherein the longitudinal stitch lines are parallel to each other.

6. The occupant restraining device according to claim 1, wherein the weave direction and the longitudinal direction of the bag have a crossing angle of 22.5° to 67.5°.

7. The occupant restricting device of claim 1 wherein the bag includes a chamber into which gas is supplied by the gas generator, and the panels comprise multiple panels above the chamber and multiple panels below the chamber.

8. An occupant restraint device for a vehicle, the occupant restraint device comprising:
   a gas generator;
   an airbag including a chamber into which the gas generator supplies inflation gas during emergency conditions;
   an upper panel of the airbag, the upper panel being of a woven fabric having predetermined weave directions thereof;
   a lower panel of the airbag, the lower panel being of a woven fabric material having predetermined weave directions thereof;
   a linearly extending edge of the airbag that extends obliquely to the predetermined weave directions of the upper and lower panels; and
   a stitch line sewn into the upper and lower woven fabric panels to interconnect the panels and extend in a linear direction adjacent and parallel to the linearly extending edge of the airbag so that the predetermined weave directions of the woven fabric panels extend obliquely to the linear direction of the stitch line to minimize stress on the stitch line and gas leakage therethrough.

9. The occupant restraining device of claim 8 wherein the predetermined weave directions of each of the panels extend orthogonal to each other and obliquely to the linear direction of the stitch line.

10. The occupant restraining device of claim 8 wherein the airbag has a width and a length greater than its width, and the airbag linearly extending edge is a longitudinal edge of the airbag extending along the length thereof so that the stitch line is a longitudinal stitch line extending along the length of the airbag.

11. The occupant restraining device of claim 10 wherein the airbag has an oblong configuration including a pair of opposite longitudinal edges and a corresponding pair of opposite longitudinal stitch lines, and a pair of curved lateral stitch lines interconnecting the longitudinal stitch lines.

12. The occupant restraining device of claim 11 wherein the curved lateral stitch lines include intermediate segments that extend obliquely to the predetermined weave directions of the woven fabric panels.

13. An occupant restraining device for a vehicle, the occupant restraining device comprising:

a gas generator;

an airbag including a plurality of woven fabric panels that are sewn together to form a chamber into which the gas generator supplies inflation gas upon airbag deployment during emergency conditions;

peripheral edges of the airbag that extend around the chamber with the peripheral edges including a pair of opposite, linearly extending edges;

stitch lines that extend in a linear direction along the linearly extending edges for connecting the airbag panels together; and edge structure distinct from the stitch lines at the linearly extending edges that is configured to minimize gas leakage out from the chamber of the airbag during deployment thereof.

14. The occupant restraining device of claim 13 wherein the edge structure comprises predetermined weave directions of the woven airbag panels that are arranged to extend obliquely to the linear direction of the stitch lines.

15. The occupant restraining device of claim 14 wherein the airbag has a length and width, and the stitch lines extend along one of the length and the width of the airbag.

16. The occupant restraining device of claim 15 wherein the stitch lines include a pair of opposite longitudinal stitch lines extending along the airbag length, and a pair of opposite, lateral stitch lines that extend along the airbag width.

17. The occupant restraining device of claim 16 wherein the longitudinal stitch lines and lateral stitch lines are interconnected by curved stitch lines.

18. The occupant restraining device of claim 13 wherein the edge structure comprises multiple panels disposed above the airbag chamber and multiple panels disposed therebelow so that at least four layers of panels are sewn together at the peripheral edges of the airbag including the linearly extending edges thereof.

19. The occupant restraining device of claim 18 wherein the gas generator is disposed in the airbag chamber.

* * * * *